United States Patent [19]

Albertsen

[11] 4,135,741
[45] Jan. 23, 1979

[54] ARMORED PIPING SYSTEM
[75] Inventor: Peter S. Albertsen, Corning, N.Y.
[73] Assignee: Corning Glass Works, Corning, N.Y.
[21] Appl. No.: 840,572
[22] Filed: Oct. 11, 1977
[51] Int. Cl.² .............................................. F16L 9/14
[52] U.S. Cl. ...................................... 285/55; 29/447;
264/230; 138/109; 285/233; 285/381;
285/DIG.12
[58] Field of Search .................. 285/DIG. 12, 45, 55,
285/369, 373, 233, 149, 381; 138/109, 120, 150;
264/DIG. 71, 230, 342 R; 156/84, 85, 86, 293,
294, 298; 29/447

[56] References Cited
U.S. PATENT DOCUMENTS 2,356,047 8/1944 Geisinger et al. ................. 285/55 X
2,732,169 1/1956 Matteo ......................... 285/DIG. 12
3,314,450 4/1967 Doering et al. ............. 285/DIG. 12
3,419,291 12/1968 Tomb et al. .......................... 285/233
3,828,823 8/1974 Douglas ............................... 138/109
3,975,039 8/1976 Penneck ................................ 156/86

Primary Examiner—Dave W. Arola
Attorney, Agent, or Firm—John P. DeLuca; Burton R. Turner; Clarence R. Patty, Jr.

[57] ABSTRACT

There has been provided an armored beaded piping system, having a boot of corrosive resistant material adapted to shield the forward end of the armor from corrosives and to provide a protective end covering, which is grasped by a pipe coupler such that separation of the pipe system from the coupler is prevented upon inner pipe failure.

10 Claims, 5 Drawing Figures (PRIOR ART)

ARMORED PIPING SYSTEM

BACKGROUND OF THE INVENTION

The invention relates to armored piping systems, and in particular to a protective end covering adapted to mate with a pipe coupler, which covering retains the pipe end within the coupling and prevents separation of the pipe from the coupler in the event of a pipe failure near the mated connection.

Prior art armored piping systems, one of which is illustrated in FIG. 1, generally consist of a beaded glass pipe 10, having a beaded end portion 13 and a circumferential coupler 17 which engages in a mating relationship with the beaded end 13 for coupling the first mentioned pipe section 10 with another pipe section 10' having a similar beaded end 13'. The beaded pipe 10 has a spirally wound circumferential armor 12 covering a main pipe section 14 of pipe 10.

In the piping system described in FIG. 1 the armor coating 12 does not normally extend from one end of the pipe 10 to the other, but more specifically, the armor coating 12 is terminated at some point 16 just rearward of the bead portion 13. The reason for termination of the armor 12 is for the purpose of protecting the armor 12 from the wicking or leakage of corrosives which might be flowing in the pipe system. A gasket seal 15, enclosed within the coupling 17, mates with the beaded end 13 and forms a tight circumferential seal thereabout. By terminating the armor 12 in the vicinity of the rear of the bead at 16, the seal made with the beaded end 13 is rendered satisfactory and the external armor 12 is protected from corrosives.

Many of the armored piping systems described herein are fabricated from glass tubing forming the pipe 10 of normally constant lengthwise wall thickness t for the main pipe section 14 rearward of the bead 13. When the bead 13 is fabricated, by conventional means, the thickness of the wall of pipe 10 in the vicinity of the bead 13 increases as illustrated. It is known that stress concentrations in glass tend to predominate in areas of dimensional change. Thus in FIG. 1 stress concentrations tend to accumulate in the area 16 just rearward of the bead 13.

If the pipe 10 fails in the area 16 rearward of the bead 13, the pipe may slip transversely out of the coupler 17 possibly causing substantial injury to personnel and damage to surrounding equipment.

The need for a more effective pipe coupling system with failure resistance is therefore apparent from the shortcomings of the described prior arrangement.

SUMMARY OF INVENTION

There has been provided an armored piping system, adapted to be mated with a coaxially conforming coupler, for joining lengths of said pipe wherein, an inner pipe member has a main pipe section with a formed beaded end, which end is adapted to mate with the coupler. Outer pipe armor extends from near a forward end of the bead and coaxially conforms with the inner pipe lengthwise thereof. A boot of corrosive resistant material is adapted to be sleeved about the beaded end portion of the inner pipe, between the inner pipe and outer pipe armor, from a point at least rearwardly of the beaded end of said inner pipe to a forward end of the bead, and with such boot continuing coaxially over the forward end, and exterior of the outer pipe armor, to a point at least rearward of the bead. The boot is adapted to be joined to and protectively shield the forward end of the outer pipe armor from corrosives carried within the inner pipe and to provide a circumferential seal with the coupler and outer wall of the inner pipe in the vicinity of the bead and rearward thereof.

Wall thickness of various elements illustrated in the aforementioned drawings are exaggerated for clarity and in practice the present invention provides great strength and performance with relatively thin wall tubes and armor coatings.

DESCRIPTION OF THE PREFERRED EMBODIMENTS

Figure 2:
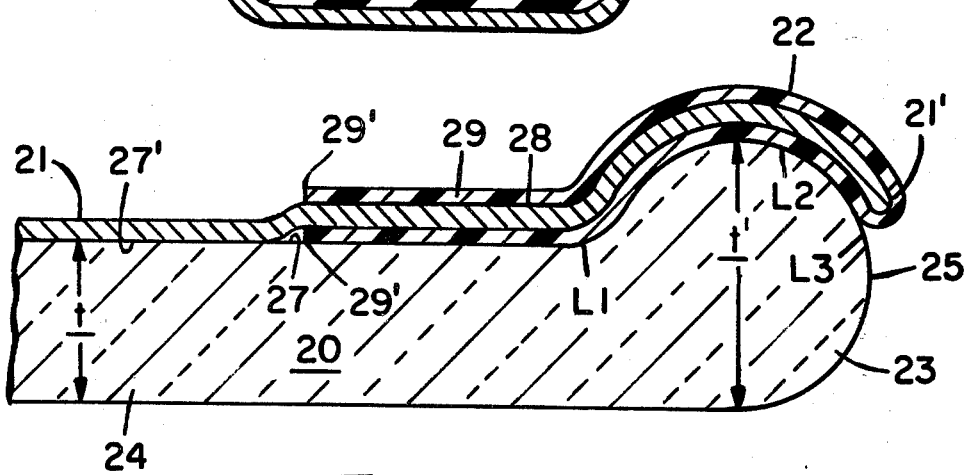
FIG. 2 is a fragmented side sectional elevation of one embodiment of the present invention, illustrating a booted end covering for the armor.

FIG. 2 illustrates, in side sectional elevation, a portion of a beaded pipe 20 having an armored wrapping 21 and booted sleeve 22. The pipe member 20 is typically manufactured from corrosive resistant glass having a main pipe section 24 of a selected wall thickness t and a beaded end portion 23. The beaded end 23 is formed on and contiguous with the main pipe section 24. It is apparent that the wall thickness t increases to some selected maximum thickness t' at a point L2 and decreases to the end of the pipe 20 at L3 with a rounded front or forward portion 25. As previously mentioned, high stress concentrations tend to develop in the region L1 where the beaded portion 23 joins with the main pipe section 24.

Armored wrapping 21 is utilized in the present invention and extends from about the point L3 circumferentially about the pipe 20 and lengthwise rearward thereof. The other end of the pipe 20 (not shown) may have another beaded end similar to the configuration illustrated.

The armor 21 may be a heat shrinkable, preimpregnated fiberglass cloth, having sufficient strength and selected qualities for the particular application. Typically, the armor 21 of the preimpregnated type mentioned above is sleeved over the pipe 20 terminating as previously mentioned at about point L3 and heat shrunk, or cured in an appropriate manner, so that a tight circumferential fit is maintained between the outer wall 27 of the pipe 20 and the inner wall 27' of the armor 21. In the present invention, however, the armor 21 extends lengthwise from one end 25 of the pipe 20 to the other (not shown) rearward from about point L3.

A boot or booted sleeve 29 is sandwiched between the outer wall 27 of the pipe 20 and the inside wall 27' of the armor 21 in the vicinity of the beaded end portion 23. The booted sleeve 29 extends from some rearward end point 29', rearward of the beginning of the bead 23 at L1, and in a continuous annular transition is sandwiched between respective exterior and interior walls 27-27' of the pipe 20 and armor 21 towards the forward end 21' of the armor 21, and thence continuously engages with the exterior wall 28 of the armor 21 in a tight circumferential relation conforming to the profile of the exterior wall 27 of the pipe 20 to about the same point 29' rearward of the beginning of the bead 23 at L1.

In the arrangement illustrated in FIG. 2, it is clear that stresses concentrate in the area rearward of the bead 23 near L1, and are capable of causing a total bead failure, that is, a separation of the bead portion 23 from the main pipe section 24. If such failure occurs, separation of the two sections will be prevented by the existence of the armor 21 maintaining the pipe 20, including respective beaded and unbeaded sections 23 and 24, axially in tact. This is not to say that the pipe 20 has not failed. It only prevents a sudden bursting of the pipe 20 at a failure point. The booted sleeve 29, extending forward of bead 23, is held in place by the coupler (see FIG. 5), and is sealed to the armor 21 along respective inner and outer walls 27' and 28 thus maintaining a continuous armor to secure the integrity of the bead 23 and main pipe section 24 upon pipe failure.

In a typical arrangement the fluid passing through the pipe 20 is of a corrosive nature and will eventually cause a leak where failure occurs. Since the piping systems of the type described are continuously checked for such failure, it would be apparent to maintenance personnel, that a failure has occured and that corrective measures should be taken, without creating a severe emergency situation.

Figure 3:
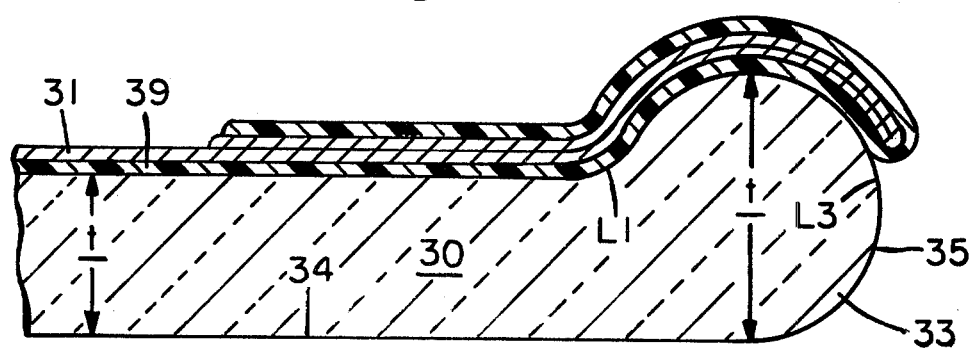
FIG. 3 is a fragmented side sectional elevation of another embodiment of the present invention, illustrating an outward turned booted end.

FIG. 3 illustrates another embodiment of the present invention, wherein a pipe section 30 having a beaded end portion 33 and a main section 34 of thickness t, has a similar armor arrangement but with a variation from that illustrated in FIG. 2. The armor illustrated in FIG. 3 consists of a multilayer fabric of preimpregnated fiberglass armored sleeving 31 and an inner layer of corrosion resistant material 39. In the arrangement illustrated in FIG. 3, inner sleeve 39 and armor 31 may be bonded or laminated together and thereafter sleeved over the pipe 30 including the beaded end portion 33 from near one end 35 of the pipe 30 to another (not shown). The outer armor 31 and inner layer 39 are together folded back over the beaded portion 33 from point L3 to rearwardly of point L1. The advantages of the particular arrangement in FIG. 3 are similar to those of FIG. 2 with the additional advantage of simplifying the construction. The designer having the option to choose a simpler fabrication technique using a laminated or layered armor 31 and 39. The arrangement of FIG. 3 may be reversed with armor 31 inward of sleeve 39 and the end folded inward of the laminated armor, without departing from the invention.

Figure 4:
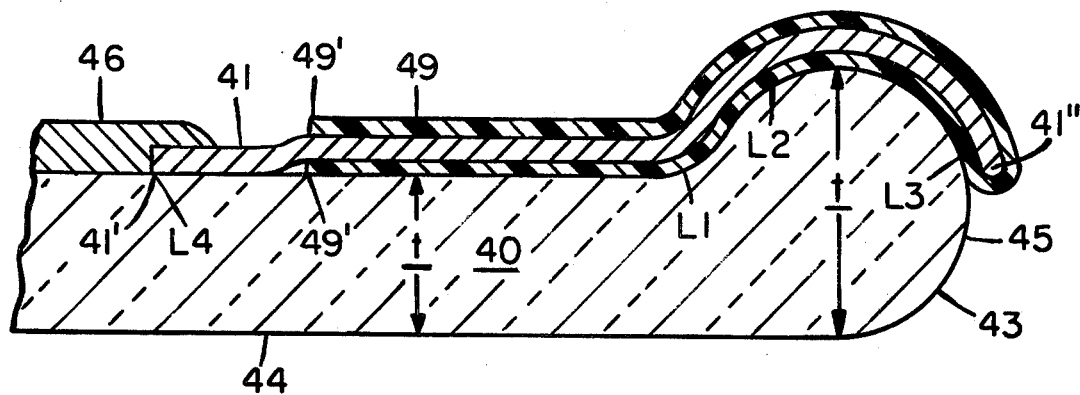
FIG. 4 is a fragmented side sectional elevation of yet another embodiment of the present invention, illustrating a booted end and wet resin cover.

FIG. 4 illustrates yet another embodiment of the present invention wherein a beaded armor pipe 40 has beaded end portion 43, a main pipe section 44 of thickness t, and an arrangement similar to that of FIG. 2, wherein a booted sleeve 49 covers a forward end 41" of an armoring sleeve 41. The boot 49 and the armoring sleeve 41 together extend rearward of the previously mentioned stress concentration area L1. The armoring sleeve may extend at its extreme rearward end 41' to about a point L4. Sleeve 41 may be a preimpregnated fiberglass fabric. A wet resin coating 46, such as fiberglass reinforced cloth and curable epoxie resin, may be spirally wrapped about the pipe 40 from one end of the main pipe section 44 to another, overlapping the rearward end 41' of the armoring sleeve 41, forward of L4 and if desired forward of rear end 49' of boot 49. Wet resin wrapping 46 is then cured by known means to set up a strong armor shield about the pipe 40. The armoring sleeve 41 and wet resin wrapping 46 provide a protected armor covering for the pipe 40 from one end 45 to its other end (not shown).

In certain applications the wet resin wrapping technique may be most cost effective in combination with the booted sleeve 49 and armoring sleeve 41, because wet wrapping is presently used in the art to protect pipes, and the improvement of the present invention is compatible with the manufacturing technique of wet wound armor. The armoring sleeve 41 and booted sleeve 49 may be fabricated over the beaded end portion 43 of the pipe 40 and thereafter the pipes may be set in normal production at facilities which are capable of wet wrapping the pipes 40 in accordance with the manufacturing equipment and techniques presently available.

Figure 1:
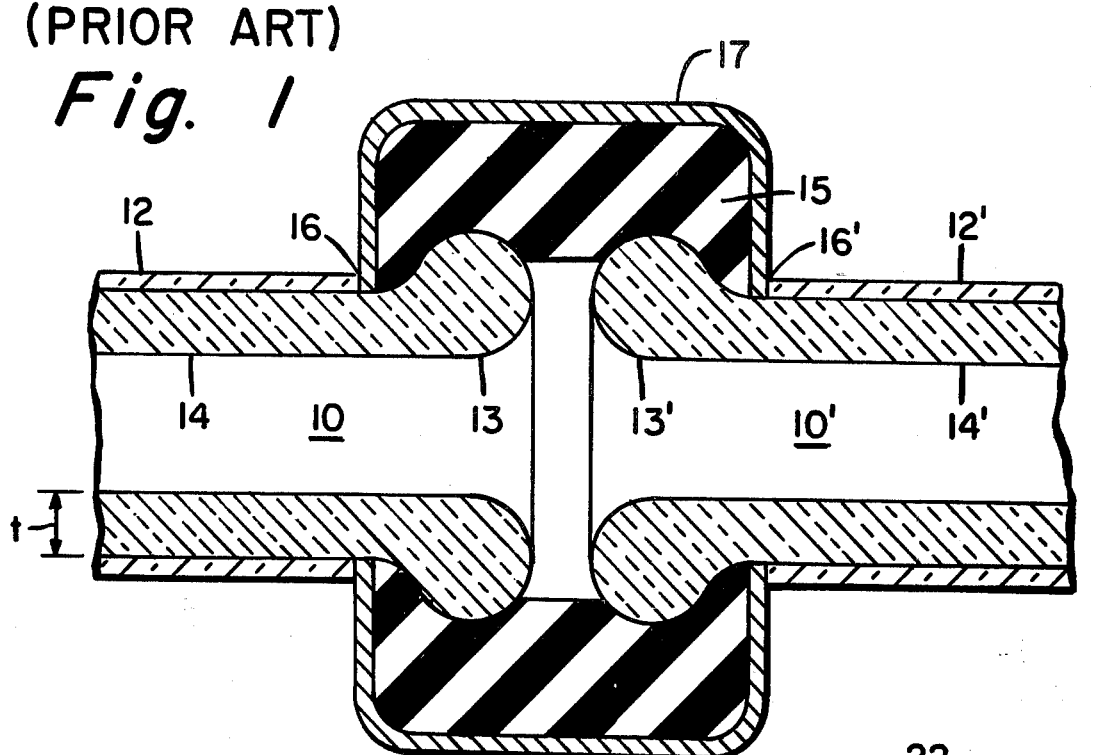
FIG. 1 illustrates an armored pipe system typical of those arrangements of the prior art in a partially fragmented side sectional elevation.
Figure 5:
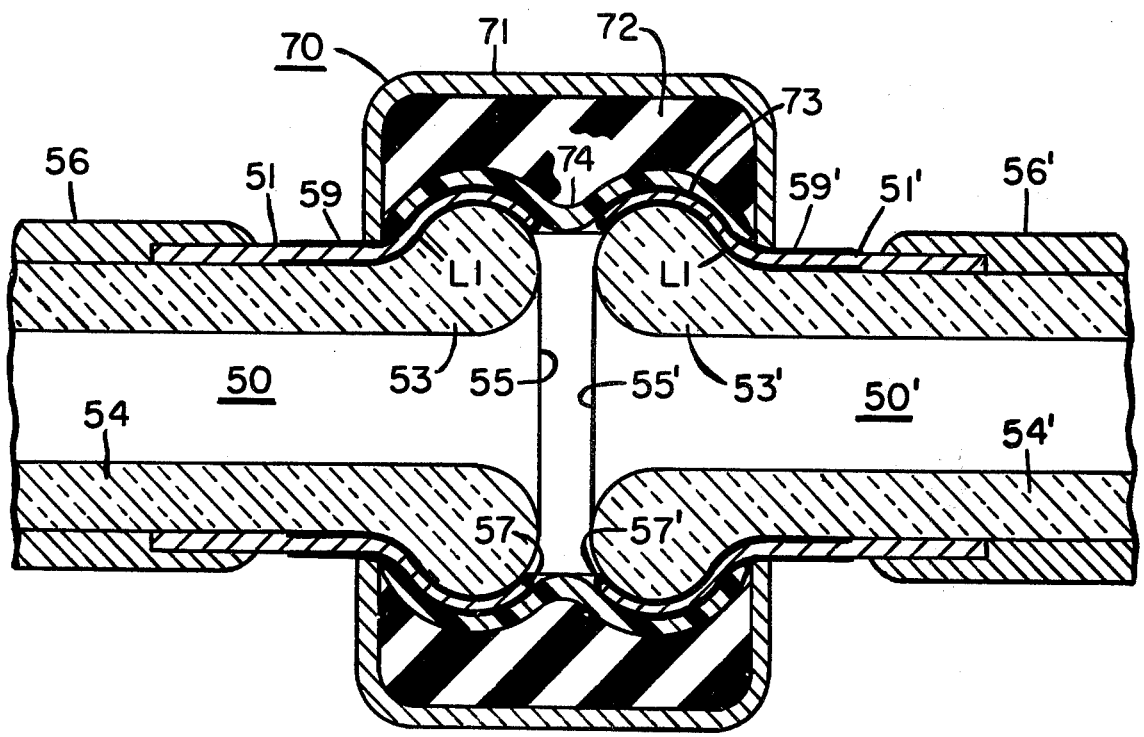
FIG. 5 is a side sectional elevation, partially fragmented, illustrating a typical arrangement of coupled armored tubing utilizing the concepts of the present invention.

In FIG. 5 there is illustrated the armored piping system of the present invention wherein a pair of pipes 50 and 50' (similar components are primed) are coupled one to the other by a coupler 70 which is similar to the coupler 17 shown in FIG. 1. The coupler 70 has an outer frame member 71 and an inner elastomer type compression ring 72 which has a formed surface 73 having a profile or contour which is adapted to mate with the beaded end portions 53-53' of the pipes 50-50'. The coupler 70 is of a known type which may be spring actuated or bolt clamped for maintaining a seal between the beaded ends 53-53' of the pipes 50-50' and the formed surface 73 of the elastomer 72. In addition to the formed surface 73 there may be included an additional corrosion resistant sleeve 74 between conforming surface 73 and beaded ends 53-53'. The pipes 50-50' have an arrangement similar to that of FIG. 4 namely a preformed armoring sleeve 51-51' and a booted sleeve 59-59' which extends rearwardly of the beaded section 53-53' to at least rearward of point L1. Wet armor 56-56' covers the main pipe section 54-54'.

The arrangement illustrated in FIG. 5 clearly shows the advantages of the present invention since tensile forces (radially outward or axially about L1) and thermal shock, as well as some external impact, may cause pipe failure. The coupler 70 illustrated in FIG. 5 provides for some misalignment between the sections of pipe 50-50' and yet maintains a tight circumferential seal along the contour of formed surface 73. Furthermore in accordance with the principles of the present invention separation of the beaded portion 53-53' and the main pipe section 54-54' of the pipe 50-50' in area L1 is prevented by use of a continuous protective cover therefor from one end 53-53' of the pipe 50-50' to the other end (not shown).

It has been found that the armoring when continued to the forward end 55-55' of the pipe 50 in the region L3 such as by armoring sleeve 51-51' and boot 59-59' tends to form a strong self supporting member even in the event that the pipe 50-50' shatters, leaving nothing but the exterior armor 51-51' and boot 59-59' for containing the fluid therein. The structural integrity and inherent strength of the beaded arrangement of the booted sleeve 59-59' with inner armoring sleeve 51-51' tends to maintain the integrity of the system even though the pipe 50-50' may be severely damaged, and in fact for all practical purposes removed from within the confines of the protective armor 51-51'. The booted sleeve 59 also prevents fluids from wicking along the inner sleeve 51.

In the present invention, because of the continuous nature of the booted sleeve 59-59', protection is provided for the forward end 57-57' of the armored sleeve 51-51' by inhibiting the seepage of corrosives into the body of the armor, and further the system is secured from bead separation in the event of stress failure in the region L1.

It has been found that a variety of corrosion resistant materials may be used for booted sleeves 29, 39, 49 and 59 as for example, a synthetic resin polymer sold under the trademark TEFLON. Similarly a fiberglass material, epoxy or polyester resin may be used to form sleeves 21, 31, 41 and 51 which may be made to conform to the exterior of its respective inner pipe 20, 30, 40 and 50 by application of heat.

In a process for manufacturing the armored pipe of the present invention reference will be directed to FIG. 4 which illustrates a preferred form for the present invention using the wet resin wrap technique.

The pipe system 40 is produced by sleeving a length of corrosion resistant heat shrinkabe substrate (boot 49) over an end of a fiberglass armoring sleeve 41. Thereafter the boot 49 is folded over the forward end 41" of the sleeve 41 so as to form a sleeve interior thereof and continuous from rearward exterior end 49' over forward end 41" and interior thereof to about the vicinity of rear end 49' of boot 49. The sleeve 41 and boot 49 may be of a diameter of about the size of the pipe 40 at the region L2, which is a maximum t' for the beaded section 43. The sleeve and boot may be heat treated over a cylindrical mandrel of appropriate diameter to form a unitary structure. Thereafter the sleeve and boot are sleeved over the section 43 so that the forward end 41" is aligned with and slightly forward of the region L3. The forward end 41" of sleeve 41 and boot 49 is heat shrunk over the forward round 45 of the bead 43 and thereafter the remaining portion of the boot 49 and sleeve 41 is heat shrunk over the pipe 40 rearward of bead 43.

A heat shrinkable disposable tape may be used to shield the boot 49 during the manufacturing process and a circular helical spring may be used to secure the boot 49 and sleeve 41 during heat shrinking near the zone L1 and rearward thereof.

After shrinking the boot 49 and sleeve 41 over the bead 43, the pipe 40 may be placed on a turning lathe with its forward end 45 held in the mandrel. The other end, not shown, is held in axial alignment with end 45. The pipe 40 may thereafter be turned for wet resin spiral wrapping, overlapping rearward end 41' of sleeve 41 and rearward thereof. The completed wrapped pipe 40 may thereafter be cured in accordance with the requirements of the resin compound.

While, there have been described, what at present are considered to be the preferred embodiments of the present invention, it will be obvious to those skilled in the art, that various changes and modifications may be made therein without departing from the invention, and it is intended in the appended claims to cover all such changes and modifications that fall within the true spirit and scope of the invention.

What is claimed is:

1. In an armored piping system armored pipes are adapted to be mated with a coaxial conforming coupler for joining lengths thereof, said armored pipes comprising: an inner pipe member having a beaded end portion adapted to mate with said coupler, an outer pipe armor, extending from near a forward end of the bead and conforming in intimate contact with the outer contour of said inner pipe along a selected length thereof, a protective boot of corrosive resistant material overlapped with and sleeved between the inner pipe and a portion of the outer pipe armor in intimate contact from a point at least rearwardly of the bead to a forward end of the bead and continuously back over the exterior of the outer pipe armor from the forward end of the bead to a point at least rearwardly of the bead overlapping the forward end of the outer pipe armor, said boot providing both a shield for the forward end of the outer armor and a circumferential seal with the coupler and outer wall of the inner pipe when mated with the beaded end of the pipe, said outer pipe armor and protective boot being of sufficient rigidity to at least temporarily maintain the piping system and coupler intact should the inner pipe fail.

2. The apparatus of claim 1 wherein the outer pipe armor comprises: a sleeve of organic binder preimpregnated with fiberglass reinforcement.

3. The apparatus of claim 2 wherein said outer pipe armor further comprises: a fiberglass reinforced cloth spirally wound with curable resin, coaxial with said inner pipe and said sleeved boot.

4. The apparatus of claim 1 wherein said sleeved protective boot comprises: a heat shrinkable synthetic polymer resin.

5. The apparatus of claim 1 wherein said coupler includes: a contoured mating surface for engaging the bead.

6. The apparatus of claim 5 wherein the mating surface of the coupler is lined with a corrosion resistant synthetic polymer resin.

7. A method for producing an armor piping system adapted to be mated with a coaxial conforming coupler for joining lengths of said piping wherein an inner pipe has a beaded end adapted to mate with said coupler, the method comprising the steps of:

providing a first armor sleeve of a selected diameter sleeveable over at least the bead and at least a portion of the pipe, sleeving the first armor over the bead and pipe in intimate conforming contact, providing a boot adapted to be sleeveable and overlap a forward end of the first armor sleeve interior and exterior thereof in a continuous fashion such that a forward end of said first mentioned armor may be encapsulated, sleeving and overlapping the boot over the forward end of the armor sleeve such that the boot encapsulates said forward end and extends to the forward end of the bead, and conforming the size of said armor and boot so as to be in intimate contact and compatible with a portion of the bead from a forward to rearward end thereof.

8. The method of claim 7 further comprising further armoring the pipe with a spirally wound wet armor from at least rearward of the bead and lengthwise of said piping, and curing said armor.

9. The method of claim 7 further comprising the steps of:

providing a protective covering over the first mentioned protective covering prior to and during the size conforming step.

10. The method of claim 7 wherein said size conforming step comprises causing reduction of said booted sleeve and first mentioned armor by heat shrinking.

* * * * *